June 4, 1968  S. SOENNICHSEN  3,386,348
EGG CARTON SETUP MACHINE

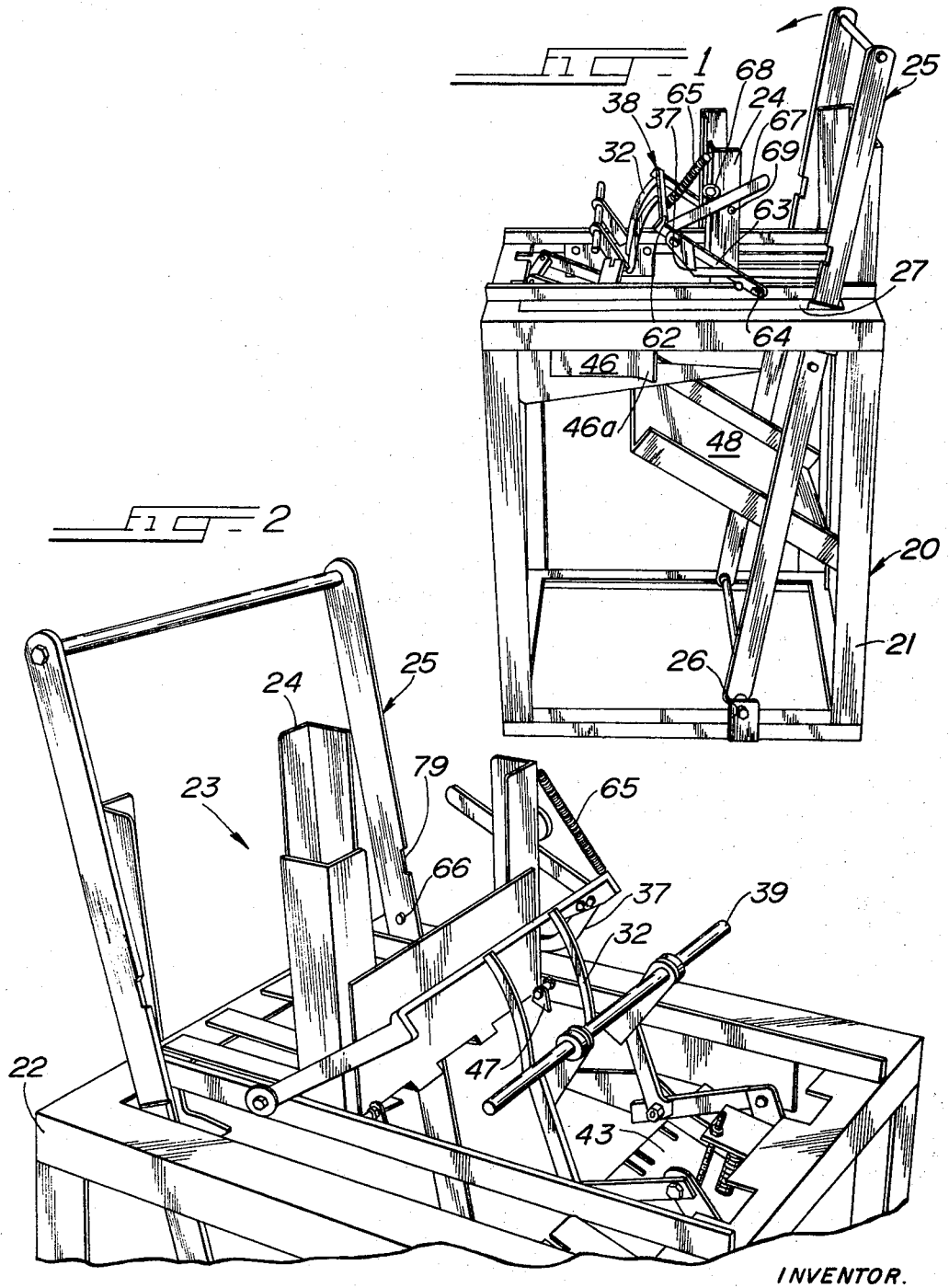

Filed May 23, 1966  7 Sheets-Sheet 2

INVENTOR.
SOENKE SOENNICHSEN
BY Dawson, Tilton, Fallon, Lungmus
Alexander

ATTYS.

June 4, 1968

S. SOENNICHSEN 3,386,348

EGG CARTON SETUP MACHINE

Filed May 23, 1966

INVENTOR.
SOENKE SOENNICHSEN

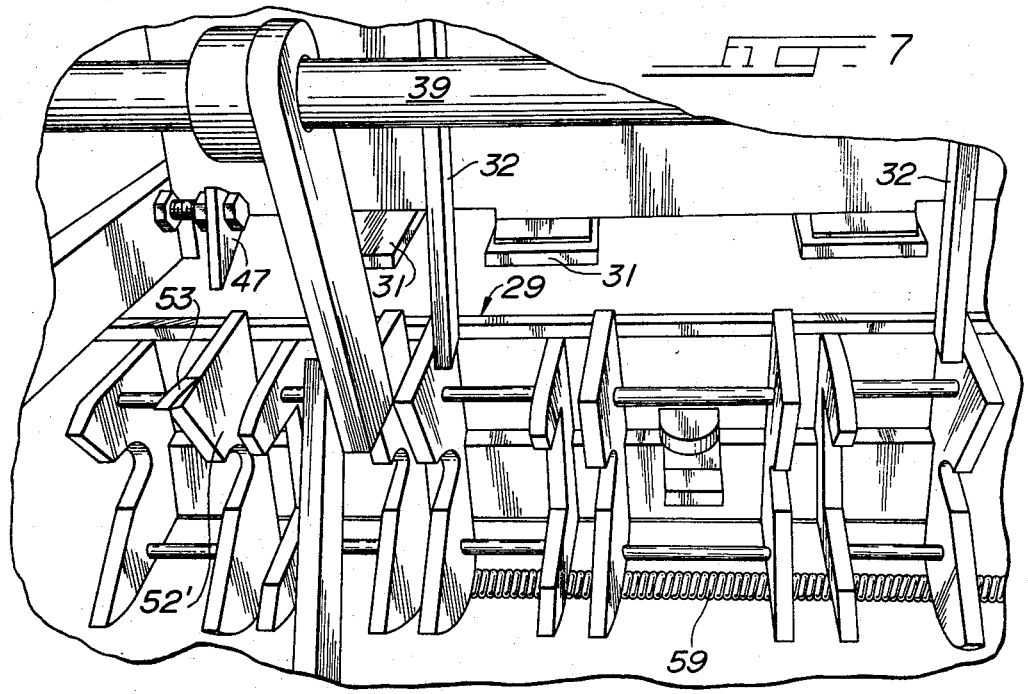
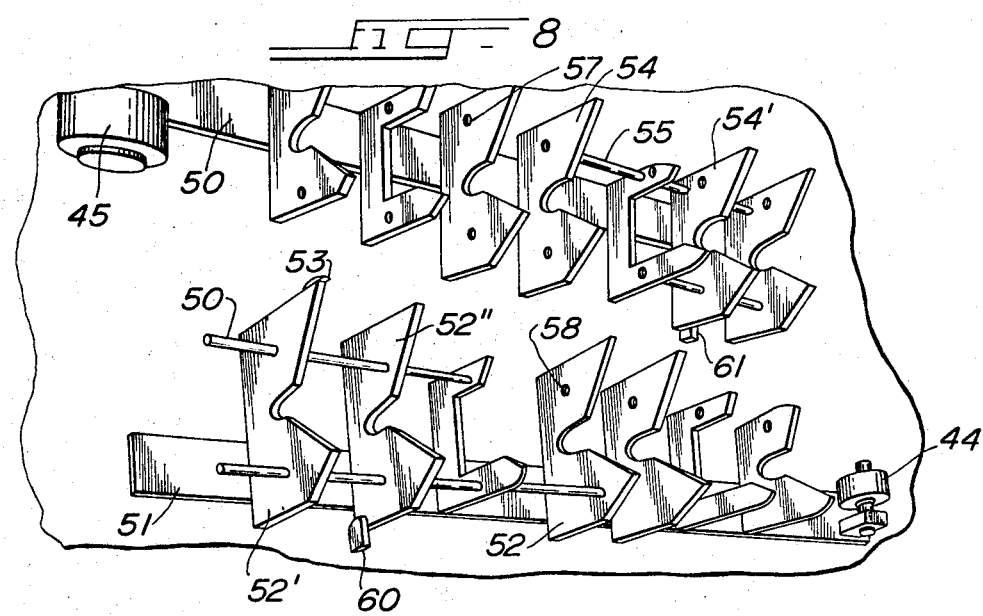

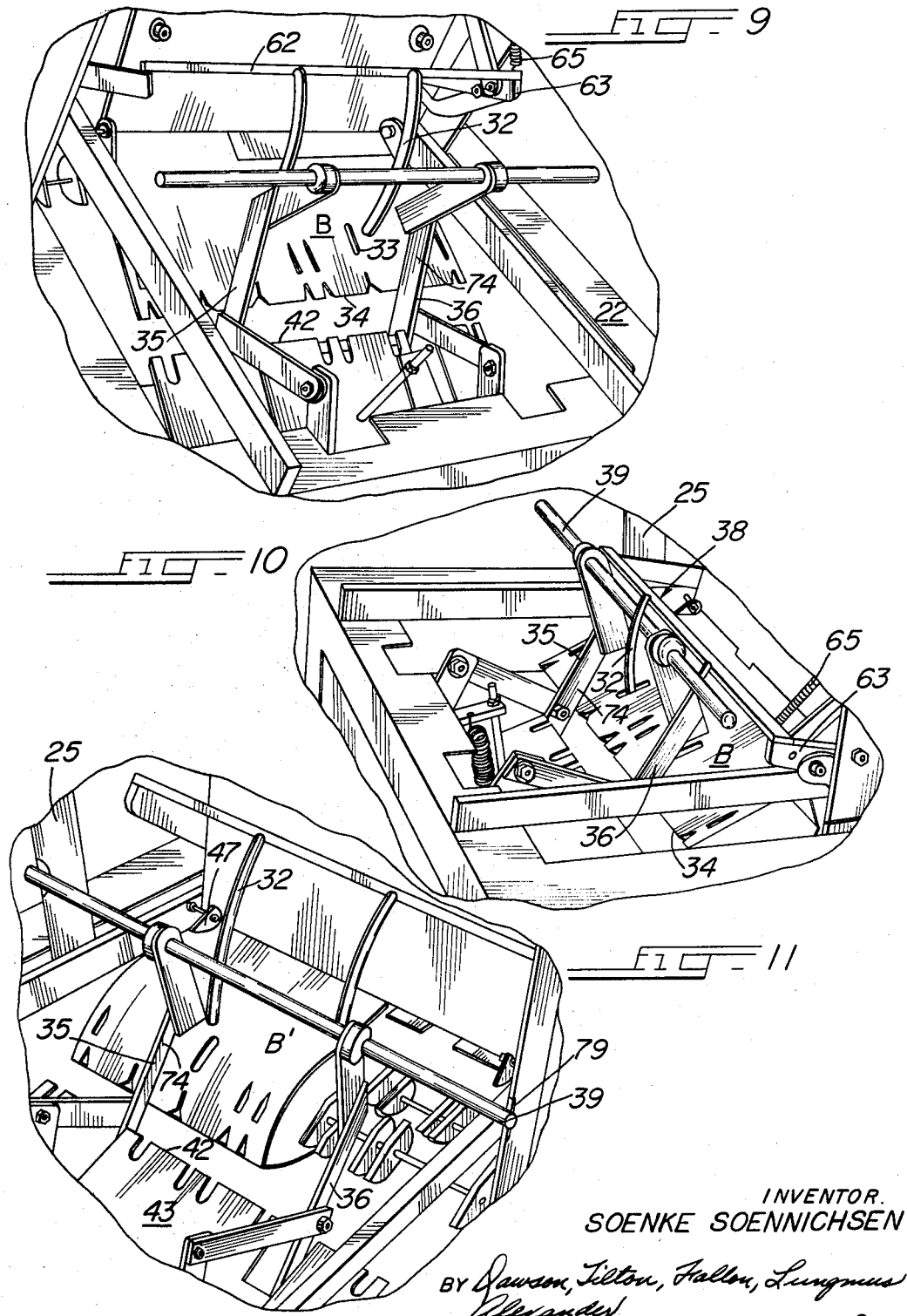

June 4, 1968   S. SOENNICHSEN   3,386,348
EGG CARTON SETUP MACHINE
Filed May 23, 1966   7 Sheets-Sheet 6
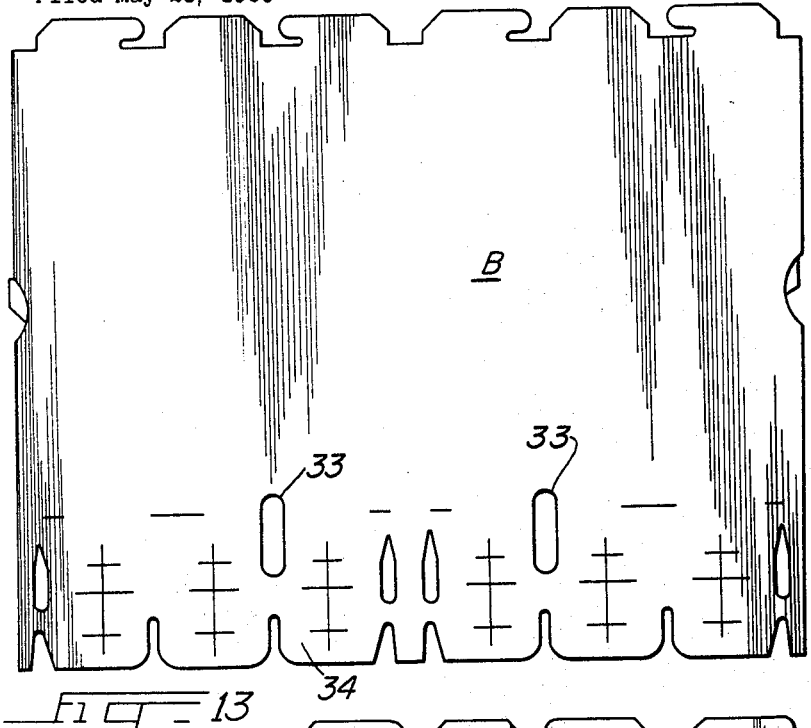
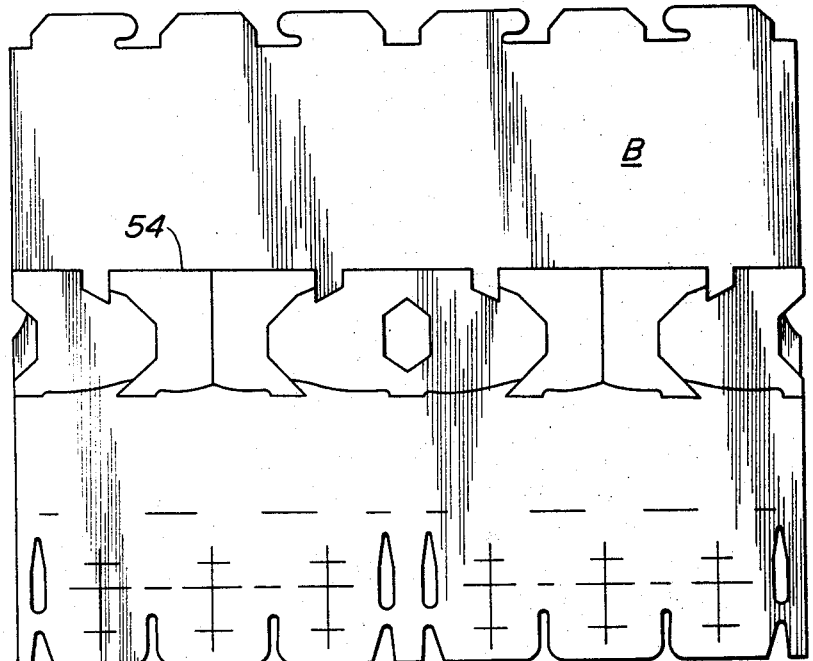
INVENTOR.
SOENKE SOENNICHSEN

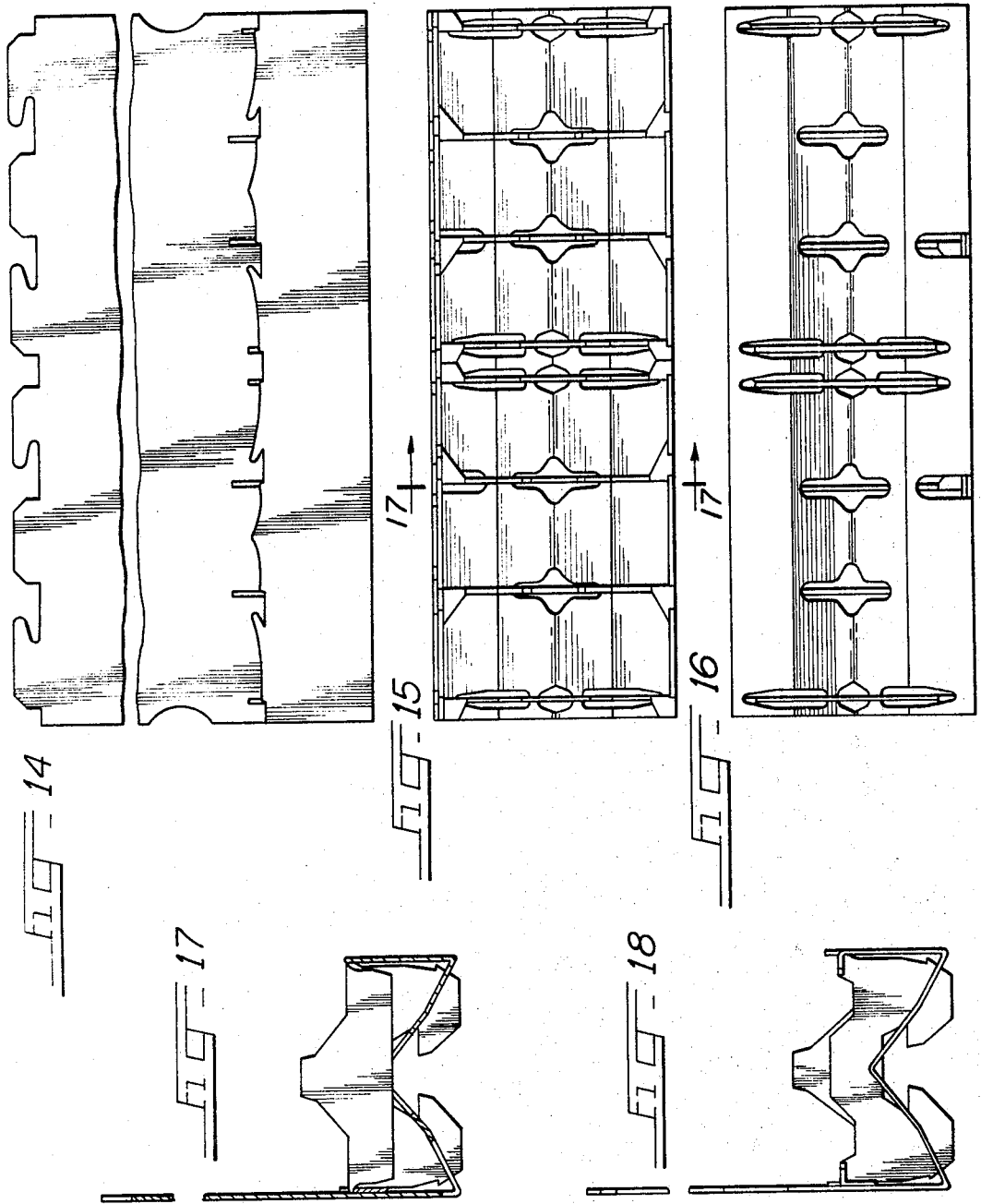

United States Patent Office 3,386,348
Patented June 4, 1968

3,386,348
EGG CARTON SETUP MACHINE
Soenke Soennichsen, Chicago, Ill., assignor to Premier Tool Works, Inc., Chicago, Ill., a corporation of Illinois
Filed May 23, 1966, Ser. No. 552,048
4 Claims. (Cl. 93—37)

This invention relates to an egg carton setup machine and, more particularly, to a machine adapted to be manually operated.

An object of this invention is to provide an egg carton setup machine wherein the relatively low volume producer of eggs can rapidly and efficiently set up cell-type egg cartons. Other objects and advantages of the invention may be seen in the details of construction and operation set down in this specification.

The invention is described in conjunction with an illustrative embodiment, in which:

FIG. 1 is a perspective view of the inventive machine as seen from the side;

FIG. 2 is an enlarged fragmentary perspective view as seen from one of the front corners of the machine;

FIG. 7 is a fragmentary perspective view of the cell-forming head as seen from the underside of the machine;

FIG. 8 is an exploded perspective view of the part making up the cell-forming head of the machine;

FIG. 9 is a top perspective fragmentary view of the machine in an initial stage of operation;

FIG. 10 is a fragmentary perspective view showing the machine in a subsequent stage of operation to that shown in FIG. 9;

FIG. 11 is a fragmentary perspective view of the machine in yet another stage of operation;

FIGS. 12 and 13 are front and rear elevational views, respectively, of a blank employed to make the egg carton setup by the inventive machine;

FIG. 14 is a fragmentary elevational view of a carton setup according to the invention;

FIGS. 15 and 16 are bottom views of the setup carton while FIGS. 17 and 18 are side views of the setup carton.

Figure 3:
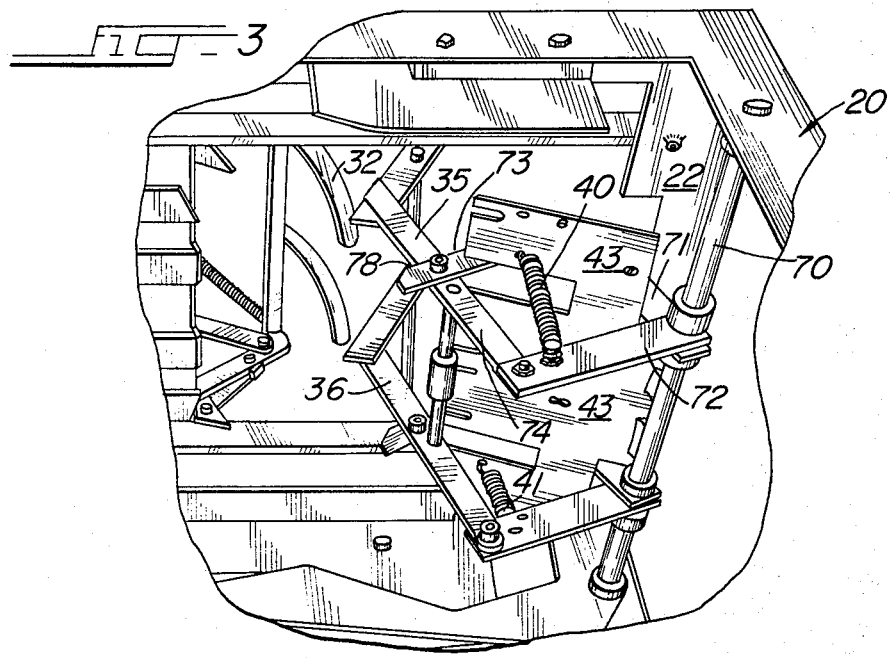
FIG. 3 is a fragmentary perspective view as viewed from the underside of the machine.

In the illustration given and with reference first to FIG. 1, the numeral 20 designates generally a rectangular frame having open sides which is defined by upright members 21. The numeral 22 (see FIG. 2) designates a perimetric generally rectangular top which provides a support for a magazine generally designated 23. The magazine is provided by corner-defining angles 24 which upstand from the frame 20 and serve as a reservoir for carton blanks of the character seen in FIGS. 12 and 13.

The numeral 25 designates generally a manually-operable handle which is adapted to be moved over a small generally horizontal arc for the purpose of setting up the carton blanks. For this purpose, the handle is pivotally mounted on the frame 21 as at 26, and the top 22 is equipped with elongated slots 27 which extend in the front to back direction.

It is believed that a general description of the operation of the machine will facilitate understanding of the invention and for that purpose, the following is set down referring, for the time being, only to those machine portions which are directly engaged in the setup operation.

A detailed description of the structure and operation follows later in this specification.

Operation in general

Figure 4:
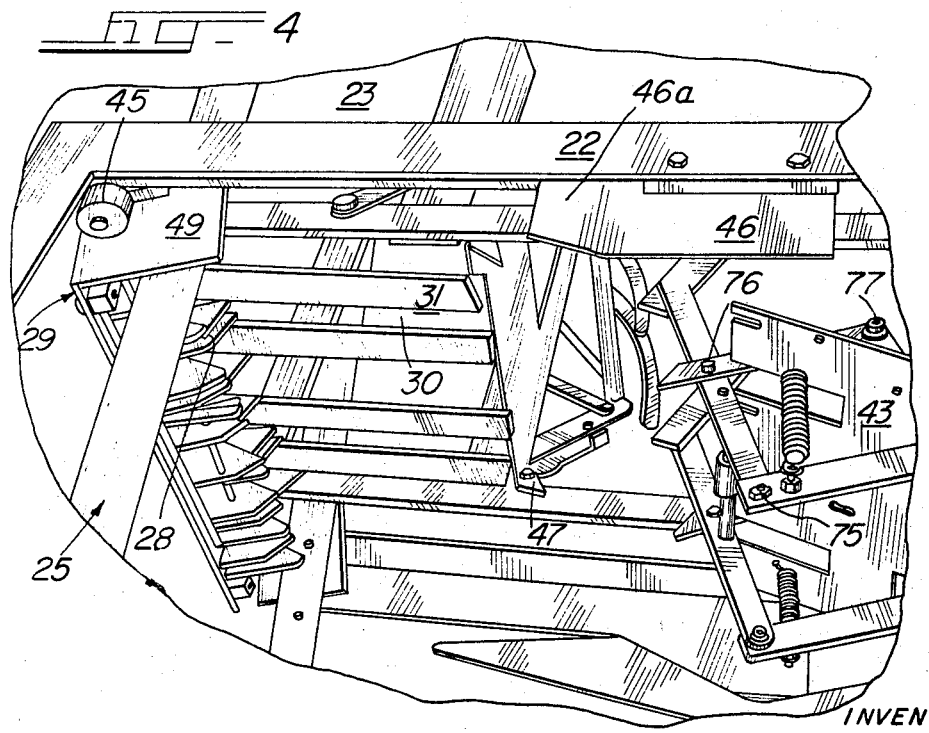
FIG. 4 is another fragmentary perspective view taken from slightly rearward of the view shown in FIG 3.
Figure 5:
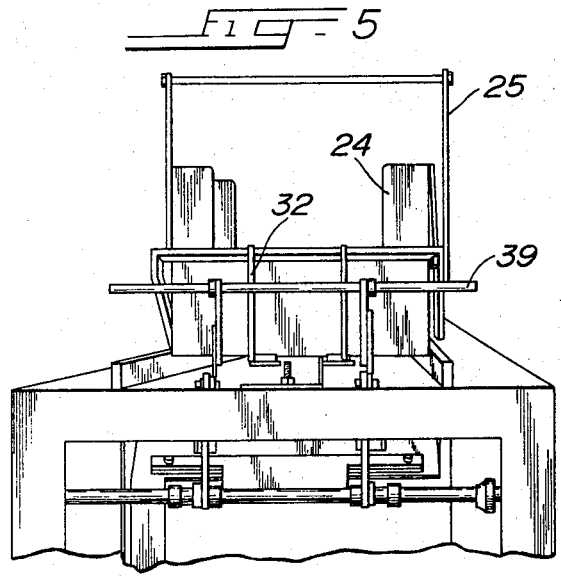
FIG. 5 is a fragmentary perspective view taken from the front of the machine.
Figure 6:
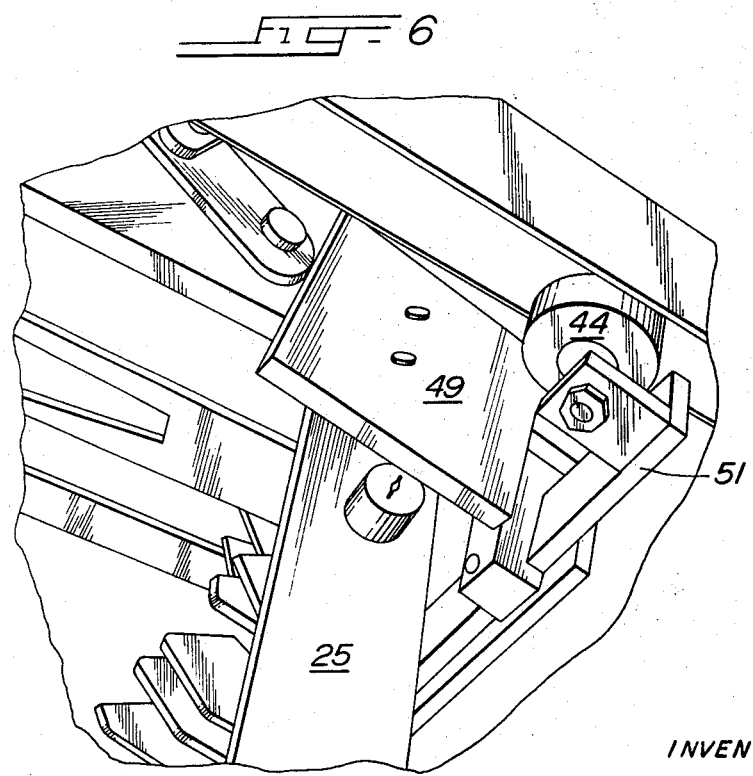
FIG. 6 is an enlarged fragmentary perspective view looking toward the rear right corner of the machine.

Reference is now made to FIG 4 and in that view the numeral 28 designates stripping fingers which are provided as part of a head generally designated 29 (and seen also in enlarged form in FIGS. 7 and 8). The fingers 29 are positioned to move forwardly in slots 30 provided by magazine supporting bars 31. It will be noted that the head 29 is secured to the handle 25, so that movement of the handle 25 forwardly, i.e., is in the direction of the arrow uppermost in FIG. 1. The fingers 28 will engage the bottom-most carton blank B (see FIGS. 12 and 13) and advance the same for "setup." At this stage of the operation, the carton blank B has assumed the position seen in FIG. 9 and is about to be opened by means of opening fingers 32 positioned to enter elongated slots 33 provided in the blank B.

The position of the opening fingers 32 when they have partially opened the blank B is seen in FIG. 10 and there it will be noted that the handle 25 is oriented substantially vertically, i.e., about midway through its arcuate stroke (compare the position in FIG. 1). Prior to this time, the leading edge 34 of the blank B has been positioned within the jaws of a pair of scissor-like linkages 35 and 36 which retard further forward movement of the blank B. The downward movement (for opening the blank B) of the fingers 32 is achieved by the engagement of the handle 25 with a cam roller 37 (see FIG. 1) which is provided as part of the initial opening assembly generally designated 38.

As the handle is moved further forwardly, the cam actuation of the fingers 32 ceases and the assembly 38 returns to its "ready" position as seen in FIG. 1. This retracted position of the fingers 32 is seen in FIG. 11 and the handle 25 is seen to be even further forward in its stroke. In FIG. 11, the handle 25 is seen to be in engagement with a cross-rod 39 which interconnects and projects upwardly from the scissor linkages 35 and 36. The movement to the front of the machine of the crossbar 39 causes the scissor linkages to open against the influence of the holding spring 40 and 41 (see FIG. 3) so that the blank now has assumed a substantial three dimensional configuration as shown in FIG. 11 and designated by the symbol B′. The means urging the blank B to the B′ configuration not only includes the now opened scissor linkages 35 and 36, but the various projections making up the head 29 which are now positioned within the blank B′. A view of the various projections provided as part of the head B′, as seen from the inside of the carton blank B′, is shown in FIG. 7.

Forward movement of the handle 25 results in even further opening of the scissor-like linkages 35 and 36 and further forward movement of the head 29. This condition persists until the forward edge 34 of the carton engages the trailing edge 42 of a stationary forming plate 43. The forming plate 43 in combination with the setup at 39 inverts the center of the generally V-shaped blank B′ to form the generally W-shaped bottom of the setup carton as seen in FIGS. 17 and 18. At the same time, various locking ears are engaged under the influence of the projections of the setup at 29. The carton setup is now complete.

Upon reversing the movement of the handle 25, the now setup carton returns with the head 29 inasmuch as the various projections on the head 29 are still in partial forming engagement with the interior cell of the carton. The various projections are caused to move together under the influence of the cam rollers 44 and 45 (see FIG. 8) so that the various projections no longer are in stretching engagement with the cells of the carton. The rollers 44 and 45 engage side plates as at 46 (see FIG. 1 in the central portion thereof) for this purpose. As the loosely held carton is moved further rearwardly accompanying the movement of the handle 25, the rear edge of the carton engages upsettable dogs as at 47 (see FIG. 2) which disengage the carton from the head 29 after which the carton falls under the influence of gravity into a discharge tray 48 (see FIG. 1).

The foregoing has been a general description of the operation of the manually-operated machine and now the details of the construction of the various parts for this purpose is set down.

*Setup head*

The unique setup head of the device performs a number of advantageous functions. As indicated above, the head 29 first is operative to strip from the magazine 23 a carton blank B. Later in the cycle, it develops the cells and lastly is effective to retract the now formed carton to discharge position away from the forming plate or creasing blade 43. The head 29 is seen to include a generally U-shaped frame 49 (see FIG. 4). The U-shaped frame includes forwardly extending arms which are bolted to the upstanding arm portions of the handle 25. Slidably mounted within the frame 49 are two crossbars 50 and 51 (see FIG. 8). The lower crossbar 51 is the one that is equipped with the cam follower roller 44 previously referred to, while the upper bar 50 is equipped with the cam follower roller 45. Further, the bar 51 is equipped with a plurality of forwardly projecting cell-forming fingers 52. Two of these fingers, designated 52′, are equipped with forwardly projecting tongues 53 (see the finger designated 52′ in FIGS. 7 and 8) for the purpose of engaging the folded edge 54 of the stacked carton blanks B (see FIG. 13).

In like fashion, the crossbar 50 is equipped with a plurality of forwardly projecting cell-forming fingers as at 54 and the fingers of both crossbars are aligned through the use of rods as at 55 and 56 and holes as at 57 and 58. Thus, a predetermined alignment of the two sets of fingers 52 and 54 is maintained. A predetermined spacing of the fingers is achieved through the use of a coiled spring 59 (see FIG. 7) which is attached to one of the fingers 52″ as at 60 and at its other end to the finger 54′ as at 61. The spring 59 normally urges the fingers of a given pair apart so as to develop a suitably shaped cell within the partly opened carton blank B′. It will be seen that the tongues 53 are spaced laterally of the magazine bottom bars 31 (see FIG. 7) so as to readily strip the lowermost blank from the magazine.

After the carton has been partially formed, i.e., to the configuration designated B′ in FIG. 11, the cell-forming fingers 52 and 54 are brought together against the urging of the spring 59 by virtue of the engagement of the rollers 44 and 45 with the camming plates 46. It will be noted that the camming plates 46 have outwardly angled entrant portions as at 46a (see FIGS. 1 and 4).

The next structure to be described in detail has to do with the opening of the cartons initially, employing the curved fingers 32.

*Opening finger mechanism*

The opening fingers 32, as seen in FIG. 9, are secured to a cross member 62 which in turn is secured to arms 63, pivoted on the frame as at 64, (see FIG. 1). The crossbar 62 is urged upwardly to a finger retracted position by means of a spring 65 (still referring to FIG. 1) interconnected between the crossbar 62 and one of the magazine defining corner angles 24. Movement of the assembly 38 to the FIG. 10 position is achieved by the engagement of a pin 66 provided on the handle 25 (see the central portion of FIG. 2) which engages the cam 37. Movement of the handle past the "center" position, i.e., generally vertical orientation, causes the pin 66 to be disengaged from the cam 37 whereupon the assembly 38 returns to its FIG. 1 position, under the guiding of a pivot arm 67 and guide rollers 68 and 69 (see FIG. 1). The cam 37 is suitably contoured for this purpose and thus enables the initial opening assembly 38 to be retracted from the openings 33 (see FIG. 12) prior to the engagement with the carton blank B of the cell-forming fingers 52 and 54.

As was pointed out previously, the carton blank B is stabilized in position for the entry of the fingers 32 by means of a pair of scissor linkages 35 and 36.

*Scissor linkages*

The scissor type linkages 35 and 36 can be best seen in FIGS. 3 and 4 and in FIG. 3, for example, it will be noted that a cross shaft 70 is supported within the frame 20. An upper arm 71 and a lower arm 72 forming the forward portions of the quadrilateral type scissor linkages are journalled on the shaft 70. The lower arm 72 is seen to be connected by means of the spring 40 to the creasing plate or blade 43 which itself is secured rigidly to the top 22. Completing the four bar linkage are links or arms 73 and 74 suitably pivotally interconnected as at 75, 76 and 77 (see FIG. 4) with the other members of the four bar linkage, i.e., the arm 71–74 inclusive. The arms 74 are extended upwardly to carry the crossbar 39 as can be readily seen from FIGS. 9–11. The arm 73 is extended somewhat to form with the arm 74 a nip as at 78 (see FIG. 3) for the receipt of the leading edge 34 of the carton blank B. As mentioned previously, the handle 25 engages the crossbar 39 and for this purpose notches as at 79 (see FIG. 2) are provided. The scissor linkages 35 and 36 stabilize the carton during the opening thereof by the finger C and also during the initial penetration thereinto by the cell-forming fingers 52 and 54. During this last mentioned phase of the cycle, the scissor-like linkages are being opened, i.e., the nip 78 being made greater so as to accommodate the more generous V configuration developed in the blank B′.

Ultimately as the handle 25 is moved even more forwardly, the leading edge 34 of the blank B encounters the trailing edge 42 of the creasing blade 43. At this time, the contact of the scissor-like linkages 35 and 36 with the blank B′ is discontinued and the rigidly mounted creasing blade 43 inverts the fold defining the leading edge 34 to snap into place the various interlocks provided on the cell defining walls of the carton C.

The pivot 76 includes a roller for engagement with the top surface of the blade 43 so as to stabilize and align the scissor linkage associated therewith with the leading edge 34 of the blank B.

During this final engagement, the fingers 52 and 54 are brought together, this being made possible by the fact that the fingers are mounted in pairs and are on two cross members 51 and 50 which are slidably mounted on the setup head frame 49. Upon rearward movement of the handle 25, the carton is carried along with the head 29 by virtue of the continued engagement of the fingers 52 and 54 with the now completely set up carton, more particularly with the cells thereof until the rearward edge of the carton engages the upsettable dogs 47. Thereafter, the previously mentioned dropping of the completed carton into the discharge tray 48 is achieved.

While in the foregoing specification, a detailed description of an embodiment of the invention has been set down for the purpose of illustration, many variations in the details herein given may be made by those skilled in the art without departing from the spirit and scope of the invention.

I claim:

1. An egg carton setup machine for manual operation comprising a frame equipped with a magazine for supporting a plurality of egg carton blanks for bottom, sequential dispensing, a handle pivotally mounted on said frame and equipped with a head mounted on said handle below said magazine for reciprocating arcuate movement whereby said head is adapted to remove the bottom-most blank from said magazine during the initial forward movement of said head, said head including a plurality of forwarding projecting fingers adapted to develop cells in said blank after the same has been partially opened, blank opening means on said frame responsive to the forward movement of said handle, blank stabilizing means on said frame adjacent the forward end thereof for engaging the forward edge of the a blank during operation of said opening means and the initial engagement of said fingers with said blank incident to forming cells, a creasing blade rigidly mounted on the forward portion of said frame aligned with said blank leading edge, and means on said frame for operating the said handle for reducing the spacing of said fingers and for removing a carton therefrom after the cells thereof are formed.

2. The machine of claim 1 in which said blank stabilizing means includes a pair of quadrilateral scissor linkages arranged to engage said blank leading edge, and means on said linkages for engaging said creasing blade for maintaining said linkages in alignment with said blank leading edge.

3. The machine of claim 1 in which said fingers are provided in pairs on said head, a pair of cross members mounted on said head for slidable movement in a direction normal to the head travel with each cross member carrying one finger of each pair, cam means on said frame for moving said cross members to position said fingers for engagement with said carton blank.

4. The machine of claim 1 in which said cooperating means includes pivotal dogs to disengage set up cartons from said fingers during rearward movement of said handle.

References Cited

UNITED STATES PATENTS

| 2,700,922 | 2/1955 | Jordan | 93—37 |
| 3,198,091 | 8/1965 | Fahey | 93—37 |

BERNARD STICKNEY, *Primary Examiner.*